J. W. RIPPER.
SEALING BAND.
APPLICATION FILED DEC. 9, 1907.

909,337.

Patented Jan. 12, 1909.

Witness:
Chas. S. Lepley.
Fred Stant.

Inventor;
Joseph W. Ripper
By F.W.H.Clay, atty.

UNITED STATES PATENT OFFICE.

JOSEPH W. RIPPER, OF MONACA, PENNSYLVANIA.

SEALING-BAND.

No. 909,337.  Specification of Letters Patent.  Patented Jan. 12, 1909.

Application filed December 9, 1907. Serial No. 405,658.

*To all whom it may concern:*

Be it known that I, JOSEPH W. RIPPER, a citizen of the United States, residing at Monaca, in the State of Pennsylvania, have invented certain new and useful Improvements in Sealing-Bands, of which the following is a specification.

My invention relates primarily to leg bands for fowls and animals which are to be immovably attached to them for marking, etc., though the invention is also applicable to other uses, such as car seals and the like.

The primary object is to provide a very simple and cheap construction of marking band which can be attached with ease and when in place presents no projections to catch dirt, etc., and cannot be removed without detection.

The device as illustrated in the accompanying drawing is applied to a leg band for marking fowls.

Figure 1:
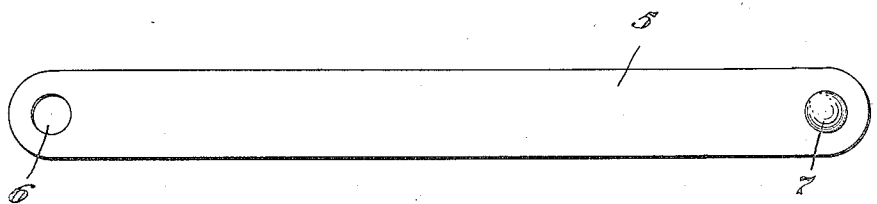
Figure 2:
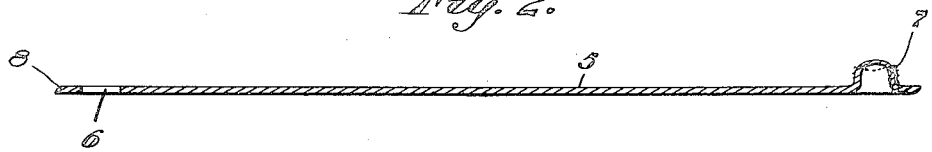
Figure 3:
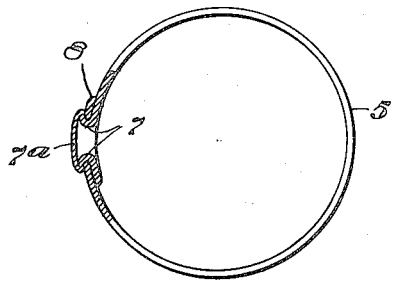
Figure 4:
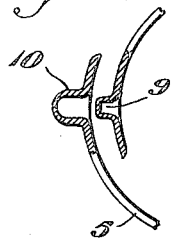

Figures 1 and 2 are respectively a plan and longitudinal section of the band in flat form. Fig. 3 is a section of the band with its ends attached and the seal made. Fig. 4 illustrates a modification sometimes used.

Metallic bands have been used before for sealing on the legs of fowls and marking them, but so far as I am aware these devices have had dangerous or inconvenient projections on them and have been more complicated and expensive than necessary. Furthermore, they have been capable of being removed from one fowl and placed on another without detection, that is the rivets or other holding devices could be cut off and the band changed by substituting a new rivet. In my device the seal having been once made cannot be loosened without plain detection, and the entire band and fastening means is in a single piece of metal.

As shown in the drawing I prefer to make the band of a strip of aluminum 5, or ductile and non-corrodible substance, and it is provided at one end with an eye or hole 6 and at the other with a coöperating sealing stud 7. The construction of this stud is peculiar, in that it is punched up out of the blank and in so forming it the metal on the crown of the stud is considerably drawn or thinned. That is the crown of the stud has less strength than the side walls, and so when a pressure is placed on it it will readily spread outward to form a projecting head and this distortion by drawing the top outwardly still further thins the metal on top so that it cannot be returned to original shape by merely punching it out of its hole.

The two ends of the band are attached by inserting the stud 7 in the hole 6 and pressing down the crown 7ª of the stud so as to make a smooth round joint as shown in Fig. 3. The crown of the stud is thinned by stretching, as also shown more exaggerated by dotted lines in Fig. 2, where the crown is more depressed than in Fig. 3. The form shown in Fig. 4 has the hole for reception of the stud covered over so that the stud 9 is entirely covered by the metal 10 when the two parts are compressed together. This would make it still more difficult to remove the stud out of its receptacle, as both the stud and its covering will flow outwardly as shown in Fig. 3, when compressed. When desired a marking number may be at the same time impressed on this crown. It will be noted that this makes a perfectly secure seal, and one which cannot be removed without destroying the band or at least so mutilating the stud as to make such removal readily apparent. It will also be noted that the finished leg band presents no projections to wound the fowl or catch threads, or grass, or dirt. There is also a great advantage in the use of the particular material I prefer, since aluminum is not subject to corrosion and forms no poisonous compounds and is conveniently pliable and light, while having amply sufficient strength. The action of the compressible stud is also better in the use of this material.

It will be evident that the device also has advantages for use in other ways such as sealing car doors and the like, though it is particularly adapted for a marker for fowls as above indicated.

Having thus described my invention and illustrated its use, what I claim as new and desire to secure by Letters Patent, is the following:

1. A leg marking band for fowls comprising an integral metallic band with lapped ends and having a hollow stud struck up from the band on one end and the metal thinned on top of the stud so as to be spread by pressure on the crown, the other end of the lap band being provided with a hole for reception of said stud, substantially as described.

2. A leg marking band for fowls comprising a metal band in one integral piece having a closed hollow stud struck up in the metal on each end of the band, one stud being adapted to fit inside the other and be locked by compression, substantially as described.

3. A leg marking band for fowls comprising a soft metal band having at each end a closed hollow stud struck up from the metal, one of the studs being adapted to fit inside the other, and one of them having the metal thinned on its crown, for easy spreading when the two are pressed together to seal the band, substantially as described.

In testimony whereof, I have hereunto signed my name in the presence of the two subscribing witnesses.

JOSEPH W. RIPPER.

Witnesses:
H. M. CORWIN,
F. W. H. CLAY.